(12) United States Patent
Walrath

(10) Patent No.: US 8,839,000 B2
(45) Date of Patent: Sep. 16, 2014

(54) SYSTEM AND METHOD FOR SECURELY STORING DATA IN AN ELECTRONIC DEVICE

(75) Inventor: Craig A. Walrath, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/259,718

(22) PCT Filed: Mar. 23, 2009

(86) PCT No.: PCT/US2009/037950
§ 371 (c)(1),
(2), (4) Date: Sep. 23, 2011

(87) PCT Pub. No.: WO2010/110780
PCT Pub. Date: Sep. 30, 2010

(65) Prior Publication Data
US 2012/0017097 A1    Jan. 19, 2012

(51) Int. Cl.
*G06F 11/30* (2006.01)
*G06F 21/86* (2013.01)
*G06F 12/14* (2006.01)
*G06F 9/00* (2006.01)

(52) U.S. Cl.
CPC .............. *G06F 21/86* (2013.01); *G06F 12/14* (2013.01); *G06F 9/00* (2013.01)
USPC ....................................... 713/190

(58) Field of Classification Search
USPC ................................ 713/190–193
See application file for complete search history.

(56) References Cited

U.S. PATENT DOCUMENTS 6,115,816 A * 9/2000 Davis ............................ 713/153
6,836,548 B1   12/2004 Anderson et al.
(Continued)

FOREIGN PATENT DOCUMENTS

CN     1265494 A    9/2000
CN     1592877      3/2005
(Continued)

OTHER PUBLICATIONS

International Searching Authority, International Search Report and Written Opinion, Appln No. PCT/US2009/037950, date of mailing Jul. 31, 2009, 11 p.

(Continued)

*Primary Examiner* — Teshome Hailu
*Assistant Examiner* — Abiy Getachew

(57) ABSTRACT

There is provided an enhanced method of securely storing and retrieving information in an electronic device. The method comprises generating a plurality of random encryption keys and storing the plurality of random encryption keys in a memory region of a first component of the electronic device. The method may additionally comprise encrypting data using a different one of the plurality of random encryption keys for each of a plurality of regions of a memory of a second component of the electronic device. The method may also comprise transferring encrypted data to the memory of the second component of the electronic device.

15 Claims, 4 Drawing Sheets

(56) References Cited

U.S. PATENT DOCUMENTS

| | | | |
|---|---|---|---|
| 7,035,953 B2 | 4/2006 | Krontz et al. | |
| 7,069,447 B1* | 6/2006 | Corder | 713/189 |
| 7,269,739 B2 | 9/2007 | Keohane et al. | |
| 7,277,542 B2 | 10/2007 | Duval | |
| 7,284,133 B2* | 10/2007 | Watanabe et al. | 713/189 |
| 2002/0188855 A1* | 12/2002 | Nakayama et al. | 713/186 |
| 2003/0115446 A1* | 6/2003 | Simon et al. | 713/100 |
| 2005/0182952 A1* | 8/2005 | Shinozaki | 713/189 |
| 2005/0210287 A1 | 9/2005 | Paatero | |
| 2006/0250585 A1* | 11/2006 | Anderson et al. | 353/79 |
| 2008/0025504 A1* | 1/2008 | Rapp et al. | 380/46 |
| 2008/0285747 A1* | 11/2008 | Kim et al. | 380/44 |
| 2008/0310636 A1* | 12/2008 | Bennett | 380/277 |

FOREIGN PATENT DOCUMENTS

| | | |
|---|---|---|
| CN | 1682869 | 8/2005 |
| CN | 1808972 | 7/2006 |
| KR | 20080093849 | 10/2008 |

OTHER PUBLICATIONS

Examination Report Under Section 18 (3) received in GB Application No. 1116379.7, mailed Feb. 25, 2014, 2 pgs.

Chinese Office Action dated May 23, 2014; cited in Appl. No. 200980158342.3; 8 pages.

* cited by examiner

SYSTEM AND METHOD FOR SECURELY STORING DATA IN AN ELECTRONIC DEVICE

BACKGROUND

In a typical computer system, system memory is used as a temporary storage for various types of data. As used herein, the term "data" refers to computer code, control information, software algorithms, operating systems (OSes), applications, security keys, credentials, financial information, personal information or any other sort of useful information. In recent times, hackers are utilizing several new or modified techniques to obtain access to the data stored on a computer system.

For example, they may steal an operating computer system, such as a notebook computer, not only for the computer itself, but also for the data stored on the system. Even if the system is locked (with a password, for example), a hacker may be able to reboot the system (for example, with a Universal Serial Bus (USB) token) while leaving the contents of the system memory intact.

Moreover, hackers may employ any number of nefarious techniques to retrieve the data stored in the memory of a computer system. Stolen information thus obtained may be used in unauthorized ways to cause harm to the owner of the data. A newer technique used now by hackers is to physically remove memory modules (system memory, graphics memory, or the like) from a user's computer, possibly freezing the memory modules to delay decay of the information contained therein. The hacker subsequently installs the stolen memory modules into another computer to read their contents, since the contents of the system memory are stored in an unencrypted format.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
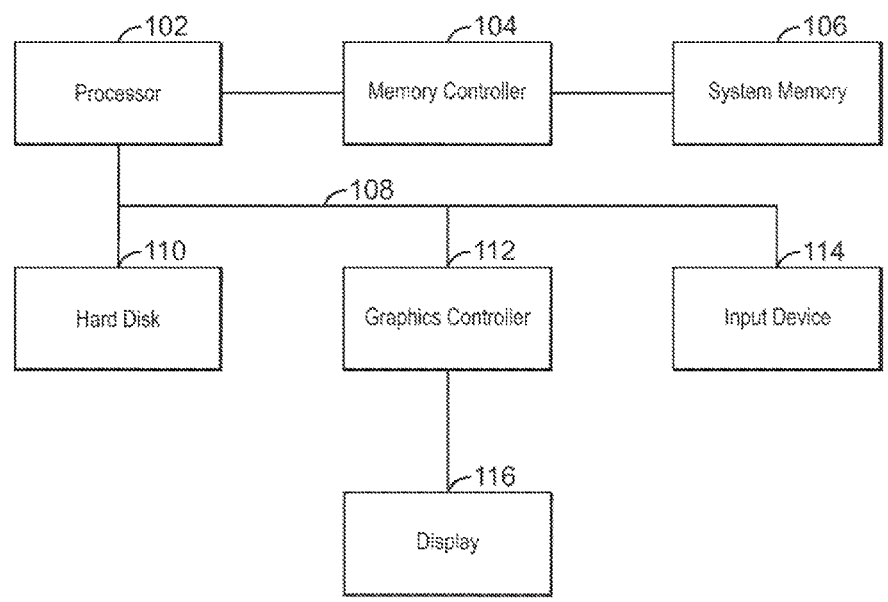
FIG. 1 is a block diagram of a computer system according to an exemplary embodiment of the present invention.

FIG. 1 is a block diagram of a computer system according to an exemplary embodiment of the present invention. The computer system is generally referred to by the reference number 100. Those of ordinary skill in the art will appreciate that the computer system 100 may comprise hardware elements including circuitry, software elements including computer code stored on a machine-readable medium or a combination of both hardware and software elements. Additionally, the functional blocks shown in FIG. 1 are but one example of functional blocks that may be implemented in an exemplary embodiment of the present invention. Those of ordinary skill in the art would readily be able to define specific functional blocks based on design considerations for a particular computer system.

A processor 102, such as a central processing unit or CPU, is adapted to control the overall operation of the computer system 100. The processor 102 is connected to a memory controller 104, which is adapted to read data to and write data from a system memory 106. The memory controller 104 may comprise memory that includes a non-volatile memory region and a volatile memory region.

The system memory 106 may be comprised of a plurality of memory modules, as will be appreciated by one of ordinary skill in the art. In addition, the system memory 106 may comprise non-volatile and volatile portions. A system basic input-output system (BIOS) may be stored in a non-volatile portion of the system memory 106. The system BIOS is adapted to control a start-up or boot process and to control the low-level operation of the computer system 100.

The processor 102 is connected to at least one system bus 108 to allow communication between the processor 102 and other system devices. The system bus may operate under a standard protocol such as a variation of the Peripheral Component Interconnect (PCI) bus or the like. In the exemplary embodiment shown in FIG. 1, the system bus 108 connects one or more processors 102 to a hard disk drive 110, a graphics controller 112 and at least one input device 114. The hard disk drive 110 provides non-volatile storage to data that is used by the computer system. The graphics controller 112 is in turn connected to a display device 116, which provides an image to a user based on activities performed by the computer system 100.

As set forth in detail below, an exemplary embodiment of the present invention is adapted to prevent data theft by providing secure communication between components in the computer system 100. Secure communication would also include the encrypting and storing of information in memory as well as the retrieval of the information and decrypting the information. In one exemplary embodiment described in detail below, the memory controller 104 is adapted to provide secure encrypted communication with the system memory 106. Those of ordinary skill in the art, however, will appreciate that the techniques disclosed herein may be used to provide secure communication between virtually any components in the computer system 100. For example, the processor 102 and/or the memory controller 104 could be adapted to securely communicate with any of the devices with which they have the capability to exchange data. Moreover, exemplary embodiments of the present invention may provide secure encrypted data to be stored on and retrieved from the hard disk 110, the graphics controller 112, the processor 102 or the memory controller 104 and could have a plurality of memory subsystems within the computer system (e.g. could have an encrypting memory subsystem for the graphics memory). The memory device that stores securely encrypted data may comprise a cache memory or any other memory suitable for use in a given application.

Figure 2:
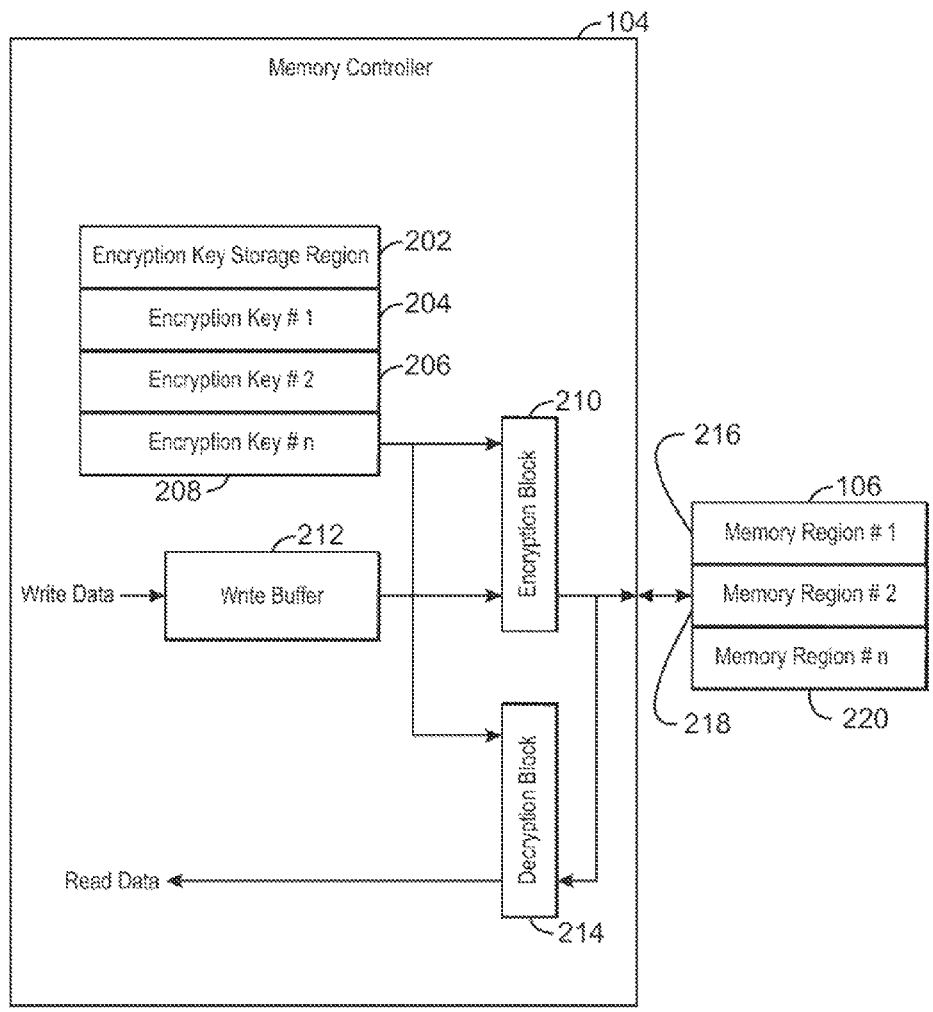
FIG. 2 is a block diagram of a memory subsystem of the computer system shown in FIG. 1 according to an exemplary embodiment of the present invention.

FIG. 2 is a block diagram of a memory subsystem of the computer system shown in FIG. 1 according to an exemplary embodiment of the present invention. The memory subsystem is generally referred to by the reference number 200. The memory subsystem 200 comprises the memory controller 104 and the system memory 106. The system memory 106 may be divided into a plurality of memory regions, which may correspond to different uses or types of memory. In the exemplary embodiment of the present invention shown in FIG. 2, the system memory contains a first memory region 216 and a second memory region 218. Additional memory regions may also exist, as indicated by an an $n^{th}$ memory region 218. As set forth below, an exemplary embodiment of the present invention may employ a different random encryption key and/or a different level of encryption for different regions of memory.

According to an exemplary embodiment of the present invention, secure transfer of data may be initiated in a wide range of circumstances. For example, a secure communication path may be initiated by generating a random encryption key when the computer system 100 is rebooted or otherwise receives a system reset. Secure communication could be initiated by generating a random encryption key when the computer system 100 resumes operation after hibernation, whether a system reset is needed to resume operation or not. Similarly, a random encryption key could be generated when the computer system 100 resumes operation following a standby state. Secure communication may additionally be initiated by forcing a system memory encryption refresh, which could generate new encryption keys for all or a portion of the memory to which data is being written. Random encryption keys could additionally be generated based on dates and/or time such as at a specific time of day or after a preset time period has expired.

In the exemplary embodiment shown in FIG. 2, a random encryption key is generated and transmitted to the memory controller 104. The random encryption key may be stored in an encryption key storage region 202. The encryption key storage region 202 may comprise a non-volatile region of memory or a volatile region of memory. The encryption key storage region 202 may be used to store a plurality of random encryption keys. For example, the encryption key storage region 202 may store a first encryption key 204 and a second encryption key 206. More encryption keys may be stored, as indicated by an $n^{th}$ encryption key 208. The use of the plurality of encryption keys is explained in detail herein.

In one exemplary embodiment of the present invention, the encryption key storage region 202 comprises a write-only/write-once register that is reset via system reset. As explained in detail below, the random encryption key is used to encrypt data that is written to the system memory 106. In one exemplary embodiment of the present invention, the memory controller 104 is contained in a first integrated circuit device and the system memory 106 is contained in a second integrated circuit device.

Those of ordinary skill in the art will appreciate that the encryption key may be generated in a number of ways. For example, the encryption key may be generated by a management engine associated with the computer system 100. An example of a management engine comprises the Intel® Management Engine available from Intel Corporation of Santa Clara, Calif. The encryption key could additionally be generated based on and responsive to user input, such as input from an administrator, a system management command or the like. The encryption key could, for example, be generated by system components such as the processor 102, the memory controller 104, a Trusted Platform Module (TPM) or the like. In addition, the encryption key could be received via an enterprise connection. The random encryption key may be generated by a system BIOS, which performs various initialization functions when the computer system 100 is booted. In one exemplary embodiment of the present invention, the random encryption key is generated without using data that could be discovered by reverse engineering any integrated circuit device in the computer system 100.

In one exemplary embodiment of the present invention, a plurality of random encryption keys are generated and selectively used by the memory controller 104 to encrypt data. The plurality of random encryption keys may be generated, for example, by the memory controller 104. Alternatively, the plurality of random encryption keys may be provided by another component of the computer system 100, such as the system BIOS. According to an exemplary embodiment of the present invention, different areas of the system memory 106 could be encrypted with different random encryption keys. Different encryption keys could be used for each page in the system memory 106. In other exemplary embodiments, multiple encryption keys could be used for each page of memory. Different encryption keys could be used for different devices or different types of memory. In addition, different encryption keys could be used for different regions of memory depending on how the region is used. For example, an OS area of memory may be encrypted with a different random encryption key relative to a non-OS program area of memory and a user data area of memory. Different encryption keys could be used for cache memory relative to system memory and different encryption keys could be used for volatile memory relative to non-volatile memory. Different random encryption keys could be used during different modes of operation. The use of multiple random encryption keys makes it difficult for a hacker to use a number generator to identify all of the random encryption keys used to encrypt the contents of the system memory 106.

In the exemplary embodiment of the present invention shown in FIG. 2, an encryption block 210 of the memory controller 104 uses the current random encryption key to encrypt all data that is written to the system memory 106. Prior to being delivered to the encryption block 204, data may be buffered in a write buffer 212.

Those of ordinary skill in the art will appreciate that any appropriate methodology of encryption may be used to encrypt data, depending on system design considerations. Moreover, a relatively simple, fast method of encryption such as an XOR method may be used to minimize the effect on system performance. More robust methodologies of encryption may be used to make decoding data more difficult for hackers. Those of ordinary skill in the art will appreciate that a stronger level of encryption may reduce system performance, but has the benefit of making it more difficult for hackers to decrypt the data. Different levels of encryption may be chosen depending on a number of factors, such as the mode of operation of the system (start-up mode, configuration mode, build time mode, enterprise and/or system management mode, normal operating mode or the like). In addition, different levels of encryption may be used depending on the user (whether the user has administrative privileges, for example). The level of encryption may vary by user and/or the rights of the user on the system. For example, a more secure level of encryption may be used if the user has administrator rights on the system. In addition, variable levels of encryption may be used for different areas of memory or different types of memory. Moreover, those of ordinary skill in the art will appreciate that the specific encryption algorithm employed by the encryption block 210 is not an essential feature of the present invention.

In one exemplary embodiment of the present invention, a simple encryption algorithm such as an XOR algorithm may be used by the encryption block 210 to minimize the impact on throughput of the memory subsystem 200. An exemplary XOR algorithm comprises performing an XOR operation using the data written to system memory and the random encryption key. The following example illustrates how an exemplary embodiment of the present invention provides enhanced security for data stored in system memory. Assume that data elements A and B are to be written to system memory after having been XOR encrypted using a random encryption key R. This process may be described using the following equations:

$$A \oplus R = C$$

$$B \oplus R = D$$

where C is the encrypted version of A and D is the encrypted version of B. The encrypted data C and D are stored in system memory rather than A or B themselves. With some mathematical manipulation, the following result is obtained:

$$C \oplus D = A \oplus B$$

Thus, a knowledgeable hacker might be able to manipulate data from a stolen memory module to recreate some conglomeration of A and B. Nonetheless, it would remain extremely difficult to obtain A and B themselves without access to the random encryption key R. The use of an exemplary embodiment of the present invention significantly increases the difficulty of making an unauthorized recovery of data from system memory When encrypted data is read from the system memory 106, it is decrypted by a decryption block 214 within the memory controller 104. The decryption block 214 performs the decryption using the random encryption key that was used to perform the encryption of the data by the encryption block 210. The decrypted data may then be provided to the processor 102. An exemplary embodiment of the present invention provides enhanced data security by writing only encrypted data to the system memory 106.

If the encryption key storage region 202 comprises a volatile memory, an exemplary embodiment of the present invention reduces the risk that a hacker or other potential data thief would be able to recover the encryption key and gain access to data that was encrypted with the particular random encryption key and subsequently stored in the system memory 106. The memory controller 104 could not be reverse engineered or "stripped" to determine the key because the value of the key would not be present in the encryption key storage region 202 upon removal of power to the memory controller. This would prevent access to data which had been encrypted using the particular random encryption key even if the data stored in the system memory was somehow preserved, for example, by freezing memory modules comprising the system memory or the like.

Figure 3:
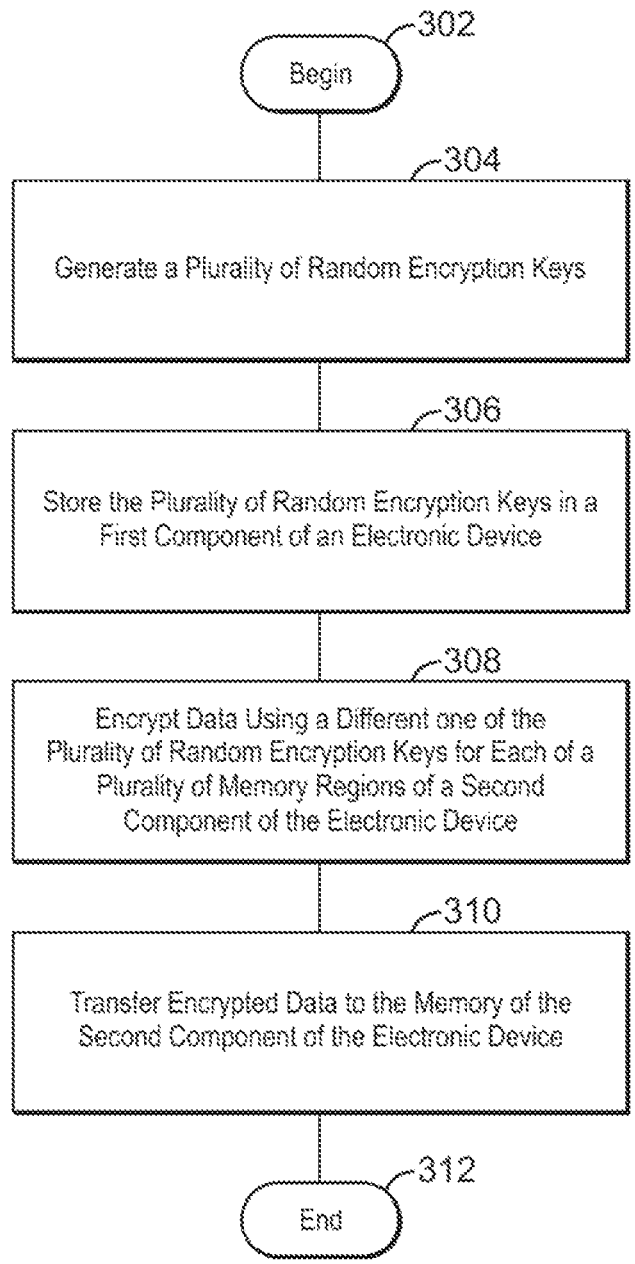
FIG. 3 is a flow chart showing a method of securely storing data in an electronic device according to an exemplary embodiment of the present invention.

FIG. 3 is a flow chart showing a method of operating a protected system memory such as the system memory 106 (FIG. 1) according to an exemplary embodiment of the present invention. The method is generally referred to by the reference number 300. At block 302, the method begins.

At block 304, a plurality of random encryption keys are generated. As shown at block 306, the plurality of random encryption keys are stored in a first component of an electronic device such as the computer system 100 (FIG. 1).

Data is encrypted using a different one of the plurality of random encryption keys for each of a plurality of memory regions of a second component of the electronic device, as shown at block 308. The encrypted data is transferred to the memory of the second component of the electronic device, as shown at block 310. At block 312, the method ends.

Figure 4:
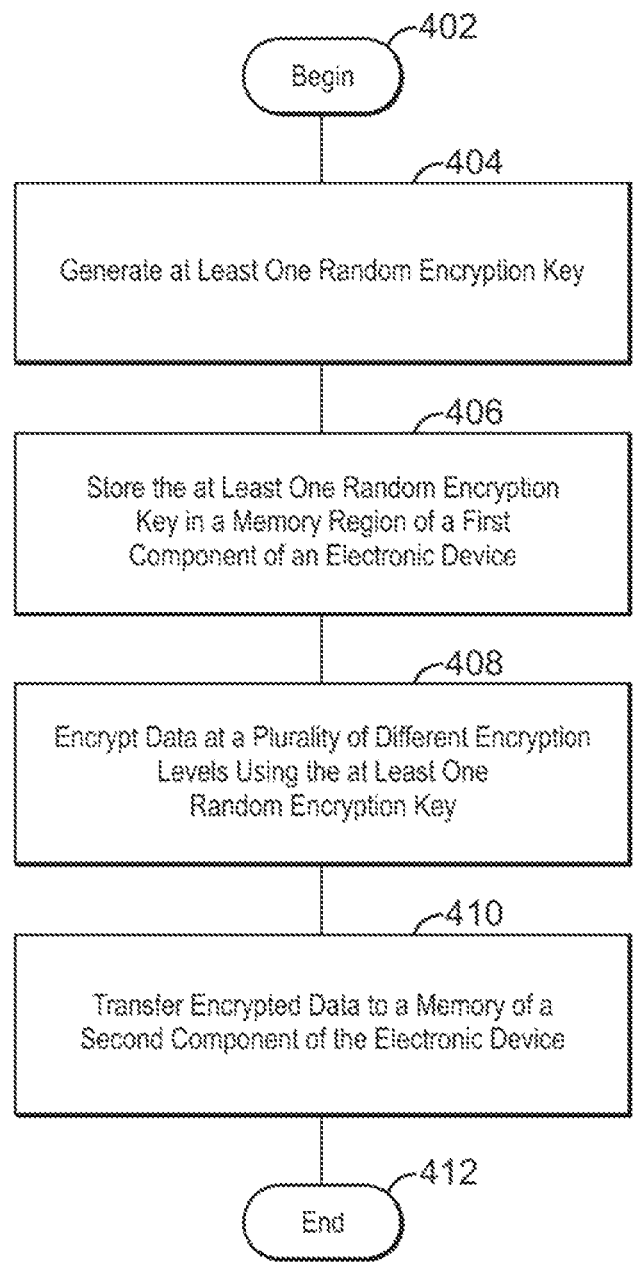
FIG. 4 is a flow chart showing an alternative method of securely storing data in an electronic device according to an exemplary embodiment of the present invention.

FIG. 4 is a flow chart showing an alternative method of securely storing data in an electronic device according to an exemplary embodiment of the present invention. The method is generally referred to by the reference number 400. At block 402, the method begins.

At block 404, at least one random encryption key is generated. The at least one random encryption key is stored in a memory region of a first component of an electronic device, as shown at block 406.

At block 408, data is encrypted at a plurality of different encryption levels using the at least one random encryption key. The encrypted data is transferred to a memory of a second component of the electronic device, as shown at block 410. At block 412, the method ends.

An exemplary embodiment of the present invention provides a secure method of communication between a memory controller and a system memory comprised, for example, of a plurality of memory modules. Such an exemplary embodiment protects system memory from a wide range of hacker attacks. In particular, an exemplary embodiment of the present invention is adapted to protect system memory from physical attacks and boot attacks. Moreover, standard memory components and modules may be used. No additional effort is required when a new generation of memory technology is introduced. An exemplary embodiment of the present invention provides system memory security without significantly impacting system performance and without impacting operating system and software application performance. Finally, an exemplary embodiment of the present invention may be implemented with minimal impact on overall system cost and complexity.

What is claimed is:

1. A method of securely storing data in an electronic device, the method comprising:
    generating a plurality of random encryption keys;
    storing the plurality of random encryption keys in a memory region of a first component of the electronic device;
    encrypting data using a different one of the plurality of random encryption keys for each of a plurality of regions of a memory of a second component of the electronic device, wherein each of the plurality of regions of the memory of the second component corresponds to a different type of memory; and
    transferring encrypted data to the memory of the second component of the electronic device.

2. The method recited in claim 1, wherein each of the plurality of regions of the memory of the second component of the electronic device corresponds to a memory page.

3. The method recited in claim 1, wherein each of the plurality of regions of the memory of the second component of the electronic device corresponds to a particular type of memory.

4. The method recited in claim 3, wherein at least one of the plurality of regions of the memory of the second component of the electronic device corresponds to a cache region of memory, a non-volatile region of memory or a volatile region of memory.

5. The method recited in claim 1, wherein at least one of the plurality of regions of the memory of the second component of the electronic device corresponds to an operating system area of memory, a non-OS program area of memory or a user data area of memory.

6. The method recited in claim 1, comprising:
    reading encrypted data from the second component of the electronic device; and
    decrypting the encrypted data read from the second component of the electronic device using the one of the plurality of random encryption keys used to encrypt the data.

7. The method recited in claim 1 wherein at least one of the plurality of random encryption keys is generated by a basic input/output system (BIOS) of the electronic device, by a processor of the electronic device, by a memory controller of the electronic device, by a trusted platform module (TPM) of the electronic device, in response to a user input, when the electronic device when the electronic device is booted, when the electronic device resumes operation from a hibernate or suspend state, when a system reset of the electronic device occurs, at a particular time of day or after a preset time period has expired.

8. A method of securely storing data in an electronic device, the method comprising:
generating at least one random encryption key;
storing the at least one random encryption key in a memory region of a first component of the electronic device;
encrypting data at a plurality of different encryption levels using the at least one random encryption key; and
transferring encrypted data to a memory of a second component of the electronic device.

9. The method recited in claim 8, wherein the memory of the second component comprises a plurality of memory types, and wherein a different one of the plurality of different encryption levels is used depending on the type of memory of the second component in which encrypted data is to be stored.

10. The method recited in claim 9, wherein a first type of the plurality of memory types comprises a cache region of memory, a non-volatile region of memory or a volatile region of memory.

11. The method recited in claim 8, comprising:
reading encrypted data from the second component of the electronic device; and
decrypting the encrypted data read from the second component of the electronic device using the one of the plurality of different encryption levels used to encrypt the data.

12. The method recited in claim 8, wherein a different one of the plurality of different encryption levels is used depending on a mode of the electronic device.

13. The method recited in claim 8, wherein a first one of the plurality of different encryption levels comprises XOR encryption.

14. The method recited in claim 8 wherein the at least one random encryption key is generated by a basic input/output system (BIOS) of the electronic device, by a processor of the electronic device, by a memory controller of the electronic device, by a trusted platform module (TPM) of the electronic device, in response to a user input, when the electronic device when the electronic device is booted, when the electronic device resumes operation from a hibernate or suspend state, when a system reset of the electronic device occurs, at a particular time of day or after a preset time period has expired.

15. A computer system, comprising:
a hard disk that is adapted to store data for use by the computer system;
a processor that is adapted to read data stored on the hard disk; and
a memory controller to receive a plurality of random encryption keys, to store the plurality of random encryption keys in a memory region, to encrypt data using a different one of the plurality of encryption keys for each of a plurality of regions of a memory of a component of the computer system, wherein each of the plurality of regions of the memory of the second component corresponds to a different type of memory, to encrypt data at a plurality of different encryption levels using at least one of the plurality of random encryption keys, and to transfer encrypted data to the memory of the second component of the computer system.

* * * * *